(No Model.)

G. W. SPURR.
EGG CASTER.

No. 557,622.   Patented Apr. 7, 1896.

Witnesses
Arthur Ashley
G. F. Downing

Inventor
G. W. Spurr
By H. A. Seymour
Attorney

UNITED STATES PATENT OFFICE.

GEORGE WRIGHT SPURR, OF MARION, INDIANA.

EGG-CASTER.

SPECIFICATION forming part of Letters Patent No. 557,622, dated April 7, 1896.

Application filed May 31, 1895. Serial No. 551,262. (No model.)

*To all whom it may concern:*

Be it known that I, GEORGE WRIGHT SPURR, of Marion, in the county of Grant and State of Indiana, have invented certain new and useful Improvements in Egg-Casters; and I do hereby declare the following to be a full, clear, and exact description of the invention, such as will enable others skilled in the art to which it appertains to make and use the same.

My invention relates to an improvement in egg-casters, the object being to provide a cheap, durable, and attractive device for supporting eggs against injury while being boiled, as well as for the purpose of supporting them until removed for consumption without rehandling.

With this end in view my invention consists in certain novel features of construction and combinations of parts, as will be hereinafter more fully described, and pointed out in the claim.

Figure 2:
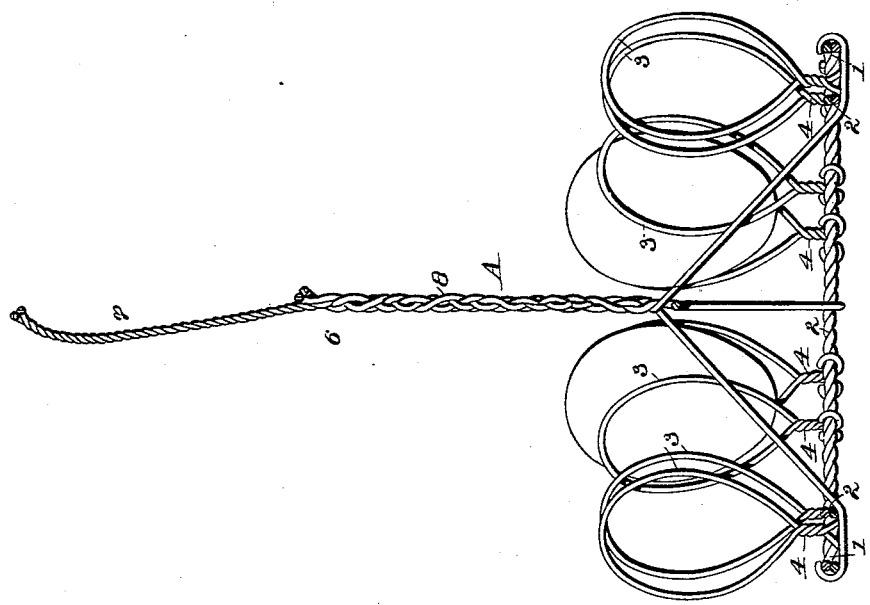
Figure 1:
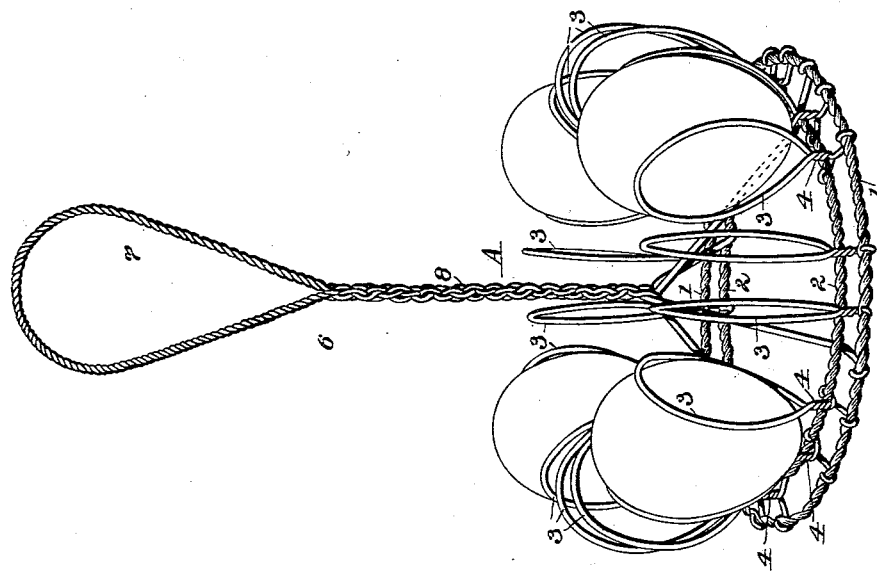

In the accompanying drawings, Figure 1 is a view of my improvement, and Fig. 2 is a section of same.

A represents my improved egg-caster, the bottom or base of which is composed of wire rings 1 and 2, each of which is preferably formed by twisting two strands of wire together. Ring 1 is of a diameter greater than that of ring 2, said rings being located in the same horizontal plane and are retained in such relation one with the other by means hereinafter more fully explained. Loops 3 are preferably formed of a single strand of wire bent to conform to the contour of an egg, the point or small end of said loops being formed by twisting the wire in the manner shown at 4. The wire is then bent in opposite directions and preferably at right angles to part 4, after which the ends are bent around rings 1 and 2 and securely fastened thereon. By securing loops 3 to rings 1 and 2 in the manner above described it will be seen that a strong base-support for said loops is obtained. Loops 3 yield slightly and are arranged in pairs, sufficient space being left between the loops constituting each pair to permit of the introduction of an egg without in any manner distorting said loops. As soon as an egg is fully within the space above referred to the loops are adapted to approach each other by virtue of their inherent spring action and clamp the egg against accidental displacement. By shaping loops 3 as described it will be seen that the object of my invention is very easily accomplished, as the entire inner surface of each pair of loops will rest in contact with the correspondingly-shaped outer surface of the egg supported.

A handle 6 is preferably formed from two strands of wire twisted together centrally a suitable distance toward their ends. Said twisted portion is then bent to form loop 7. The wires are again twisted or plaited to form a shank, as shown at 8, after which the strands are separated and their ends secured to the rings 1 and 2, thus forming a rigid connection between handle 6 and the rings. In order to prevent the strands from untwisting at the point where they separate, solder or other fastening means is employed for rigidly locking the wires against movement.

To put my improvement into operation, an egg is first placed within each pair of loops, after which the caster is deposited in a sufficient amount of boiling water to cover the eggs, and when the latter have boiled the required length of time the caster is removed from the water, dried by heat or other means, and placed upon the table, after which the eggs are served directly from the caster.

Having fully described my invention, what I claim as new, and desire to secure by Letters Patent, is—

As an article of manufacture, an egg-caster comprising two concentric rings, a central handle the wires of which are secured at their lower ends to these rings, and loops composed of wires, the ends of which are fastened to the rings, substantially as set forth.

In testimony whereof I have signed this specification in the presence of two subscribing witnesses.

GEORGE WRIGHT SPURR.

Witnesses:
GEORGE W. HARVEY,
FRANK STOUT.